(12) United States Patent
Chakravarthy et al.

(10) Patent No.: US 9,565,305 B2
(45) Date of Patent: Feb. 7, 2017

(54) METHODS AND SYSTEMS OF AN AUTOMATED ANSWERING SYSTEM

(71) Applicants: Sriram Chakravarthy, Saratoga, CA (US); Rammohan G. Menon, Los Altos, CA (US); Madhav Vodnala, San Jose, CA (US)

(72) Inventors: Sriram Chakravarthy, Saratoga, CA (US); Rammohan G. Menon, Los Altos, CA (US); Madhav Vodnala, San Jose, CA (US)

( * ) Notice: Subject to any disclaimer, the term of this patent is extended or adjusted under 35 U.S.C. 154(b) by 0 days.

(21) Appl. No.: 14/738,820

(22) Filed: Jun. 12, 2015

(65) Prior Publication Data

US 2015/0365527 A1 Dec. 17, 2015

Related U.S. Application Data

(60) Provisional application No. 62/011,031, filed on Jun. 12, 2014.

(51) Int. Cl.
| | | |
|---|---|---|
| H04W 4/02 | (2009.01) |
| H04M 3/493 | (2006.01) |
| H04W 12/06 | (2009.01) |
| H04W 4/16 | (2009.01) |
| H04M 3/42 | (2006.01) |

(52) U.S. Cl.
CPC ............. *H04M 3/493* (2013.01); *H04W 4/021* (2013.01); *H04W 4/16* (2013.01); *H04W 12/06* (2013.01); *H04M 3/42382* (2013.01)

(58) Field of Classification Search
CPC ........ H04W 4/02; H04W 12/06; H04W 12/08; H04W 12/12
USPC ................ 455/410, 411, 412.1, 414.1, 414.2
See application file for complete search history.

(56) References Cited

U.S. PATENT DOCUMENTS

| | | | | |
|---|---|---|---|---|
| 7,519,529 B1 * | 4/2009 | Horvitz ................. | G06F 17/279 |
| | | | 369/30.04 |
| 2013/0179494 A1 * | 7/2013 | Chakravarthy ...... | G06Q 10/101 |
| | | | 709/203 |

* cited by examiner

*Primary Examiner* — Sam Bhattacharya (57) ABSTRACT

In one embodiment, a computer-implemented method of a designated automated answering system (AAS) includes receiving a client-side application message to an AAS. The AAS includes a server-side entity managed by an enterprise. The client-side application message comprises a user's query for enterprise-related information. The client-side application message are parsed to identify user-identification data. A step includes determining one or more information sources relevant to the query for enterprise-related information. At least one or more information sources are queried. A step includes receiving a query information from the at least one or more information sources. The query information is relevant to the user's query. A natural-language text message that responds to the user's query is generated. The natural-language text message includes a single response.

9 Claims, 8 Drawing Sheets

METHODS AND SYSTEMS OF AN AUTOMATED ANSWERING SYSTEM

This application claims priority from U.S. Provisional Application No. 62/011,031, title METHODS AND SYSTEMS OF AN AUTOMATED ANSWERING SYSTEM and filed Jun. 12, 2014. This application is hereby incorporated by reference in its entirety for all purposes.

BACKGROUND

1. Field

This application relates generally to electronic messages, and more specifically to a system, article of manufacture and method of an automated answering system and/or other services.

2. Related Art

A significant rise of messaging in mobile from a consumer standpoint is occurring. It is noted that usage of messaging in an enterprise context can be different. For example, messaging can be closely tied with the corporate business applications. Accordingly, improvements in a simple reply-request mobile messaging paradigm can be applied to retrieve information from business applications.

BRIEF SUMMARY OF THE INVENTION

In one embodiment, a computer-implemented method of a designated automated answering system (AAS) includes receiving a client-side application message to an AAS. The AAS includes a server-side entity managed by an enterprise. The client-side application message comprises a user's query for enterprise-related information. The client-side application message are parsed to identify user-identification data. A step includes determining one or more information sources relevant to the query for enterprise-related information. At least one or more information sources are queried. A step includes receiving a query information from the at least one or more information sources. The query information is relevant to the user's query. A natural-language text message that responds to the user's query is generated. The natural-language text message includes a single response.

Optionally, a step can include determining that more than one response is available to the user's query. One or more queries can be provided to the user via the client-side application. A step can include receiving one or more user responses to the one or more queries. The user can use responses to determine a most relevant response to the user. A step can include using the most relevant response as the single response.

BRIEF DESCRIPTION OF THE DRAWINGS

FIGS. 7 A-B illustrate an example process, according to some embodiments.

The Figures described above are a representative set, and are not an exhaustive with respect to embodying the invention.

DESCRIPTION

Disclosed are a system, method, and article of manufacture of an automated answering system and/or other services. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein in, use of terms such as 'current', 'real time' and/or other similar synonyms assume various latencies such as networking and/or processing latencies.

DEFINITIONS

Knowledge base can be a store complex structured and unstructured information. The knowledge base can include enterprise information.

Inference Engine can be an Artificial Intelligence tool (e.g. an expert system).

Information retrieval can be the activity of obtaining information resources relevant to an information need from a collection of information resources. Searches can be based on metadata or on full-text (or other content-based) indexing. Example information retrieval methods that can be implemented herein include, inter alia expert search finding, genomic information retrieval, geographic information retrieval, information retrieval for chemical structures, information retrieval in software engineering, legal information retrieval, and/or vertical search.

Machine learning, can include the construction and study of systems that can learn from data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Mobile device can include smart phones, cell phones, personal digital assistants, tablet computers, computers, smart watches, smart glasses (e.g. Google Glass®), etc.

Natural language processing (NLP) can include natural language understanding and other algorithms that enable computers to derive meaning from human and/or other natural language input. NLP can also provide for natural language generation (e.g. convert information from computer databases into readable human language).

Text message can be a form of an electronic message. Exemplary text messaging systems include, inter alia, short message service (SMS) messages, multimedia messaging service (MMS) message, instant messaging programs for mobile devices (e.g. iMessages® and the like for other mobile operating systems), other proprietary text messaging applications and/or systems.

EXEMPLARY METHODS

An automated answering system (AAS) is provided. The AAS can answer questions with meaningful/relevant responses. The questions can be provided from a text messaging system (e.g. a proprietary text messaging system provided via a mobile application). An example interaction pattern may be similar to how users send and/or receive SMS messages on mobile devices. A user can communicate a text message query to AAS service. For example, the text message can be: "Where are we with XYZ opportunity". The AAS service can automatically obtain the answer and provide an automated, contextual response via text message such as: "Status was updated to "Won" by Mike Charles 2 days ago". The AAS service is also capable of including voice to speech functionalities. In this way, a user with a non-touch input mobile device (e.g., Google Glass®) can interact with an AAS. The AAS can respond by computing/ querying for information from enterprise systems, databases and other information repositories and returning a best match result. The AAS can also implement computation on behalf of the user and using users' permissions and privileges (e.g. a level of access granted in computer security).

An AAS can implement various prioritized responses based on user preferences or user behavior to a received user text message query. In addition to answering, responses, the AAS can perform specific actions requested and/or implied by a user text message. For example, the AAS can forward the response as another text message to another user and/or group. The AAS can forward the response in other electronic message formats (e.g. via email and/or SMS). The AAS can request to schedule updates and/or responses to the user's query. For example, a user can schedule the same question to be asked on daily, weekly (timely) basis. For example, the question user query may be "What's our current sales pipeline". The user can schedule to automatically communicate this query to the AAS every week. Alternatively, the AAS need not wait for the automatic weekly query from the user-side application, but rather automatically provide a weekly response to the original query. An AAS can include a snooze option. For example, a user can 'snooze' (e.g. delay) the response and ask the AAS to remind him/her after a particular period of time. In one example, the user can request What's Jack Blake's phone number" and snooze the response until "5 PM". The AAS can communicate the response 5 PM. These examples are provided by way of example and not of limitation.

It is noted that an AAS can provide various types of responses according, to the information requested in the user query. Reponses can vary from simple text responses to images and specific type of business objects depending on the type of hot (e.g., a virtual agent, an automated or semi-automated tool that carries out repetitive and mundane tasks, etc.).

In some examples, an AAS can accept a set of continuous queries/questions. A user can ask a series of related questions wherein a subsequent question can relate to an earlier questions/response. Accordingly, the AAS can preserve the context of the conversation. For examples, a question may be: "What is the status of the HP deal?" After one or more subsequent query/response iterations, the user may wish to obtain further/deeper information about the HP deal. The user can query: "Who is working on this deal", "When was the last activity on this deal", or another query related to an earlier provided for 'deal'. The AAS can relate/link the word 'deal' back to an earlier query or set of queries. The AAS can then provide a contextually meaningful response.

AAS services can be provided as part of a subscription service. Users can subscribe to various categories of AAS. AAS can specialize in various information genres. Various categories of AAS services can be provided. For example, a public AAS can provide a generic services. The public AAS can used by any user across an organization enterprise. The response can also be generic and not specific to any organization's business applications. An example of a generic AAS service can be a support AAS (e.g. technical support service, news, stock information, etc.). Private proprietary AAS services can also be provided. This AAS can be configured specifically by each organization based on the target business application(s) they would like to service. For example, a sales AAS can be used to answer specific sales-related queries for an organization. The sale AAS can be tied to the organizations sales application. The sales AAS can have access to the sales application resources and/or databases. Another example, can be a human resources AAS that answers queries specifically for an organization's human-resources applications.

In one embodiment, an AAS can traverse multiple business applications (e.g. human resources, sales, shipping and tracking, customer relationship management, marketing, accounting, expense management, etc.). In one example, each AAS need not be tied to a business application (e.g. Salesforce®, oracle ERP®, etc.). Rather, an AAS can transverse multiple business applications. For example, if the organization uses Salesforce® for tracking, opportunities and uses UPS® to ship packages to its customers, an AAS can traverse across these systems to respond to questions/queries from users. For example, continuing a previous example, a user may provide the query "did we close the HP deal?". The user can then query the same AAS: "Did we ship the CD to HP?". The AAS can obtain the information from the shipping department, parse it, and generate a response: "Yes—it was shipped on Monday—the tracking code is UX23124".

A user can setup specific notifications associated with an AAS. These notifications can be setup when the user implements a "schedule" action up receipt of a response. The user can also review all the notifications they have set for each AAS, change or update them as necessary. An AAS can be implemented without exposure of data to an enterprise's IT department. The AAS can also be provided with a colloquial language element (e.g., jokes, snide comments, etc.).

Figure 1:
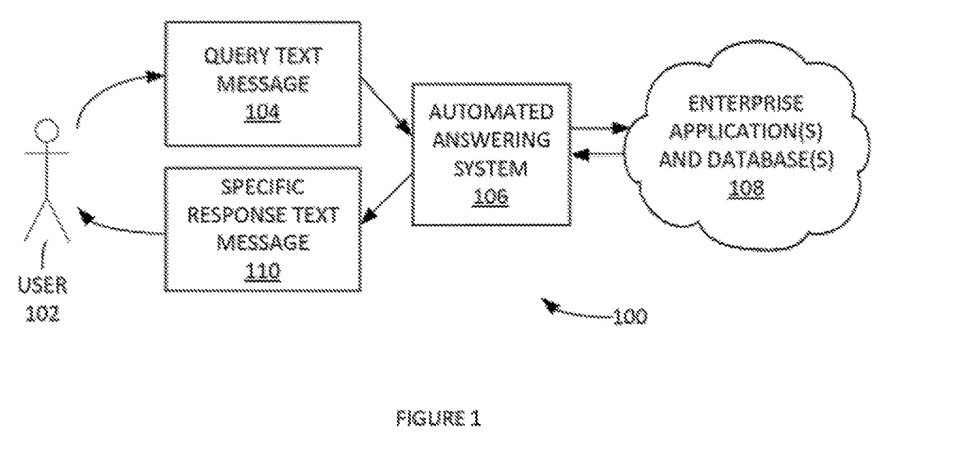
FIG. 1 illustrates an example computerized process of an automated answering system, according to some embodiments.

FIG. 1 illustrates an example computerized process 100 of an AAS 106, according to some embodiments. In a step of process 100, a user 102 can use a text messaging and/or other client-side application to compose and communicate a query text message 104 to a designated AAS 106. User identification data and/or other metadata (e.g. context data such as location, etc.) can also be communicated to the AAS 106. It is noted that in some embodiments, a voice message can be communicated in lieu of a text message. A speech-to-text functionality can then be used to convert the voice message to a computer-readable medium. AAS 106 can then parse and analyse the incoming text message. AAS 106 can determine one or more information sources (e.g. various enterprise applications and/or databases 108, third-party data sources such as online social networks, news aggregators, sports information sources, other knowledge bases, etc.). AAS 106 can query the one or more information sources and receive the information relevant to the user's query.

It is noted that the type of information obtained by AAS 106 can depend on the identity of the user providing query text message 104. In one example, a user can undergo a user-authentication process to establish identity and/or permissions with AAS 106. In another example, user authentication can be automatically performed based on user identity and/or other metadata obtained from such sources as the text message (e.g. device origin/location), user identity metadata from a client-side application in the user's mobile device, etc.

AAS 106 can generate a natural language text message. As opposed to a search result with a plethora of results, AAS 106 can generate a single response. In the event that one or more options may be possible, AAS 106 can provide queries to the user to determine a most relevant response to the user. Moreover, AAS 106 can query a user to provide explanations that assist AAS 106 in information retrieval and/or natural language generations steps.

Example Computer Architecture and Systems

Figure 2:
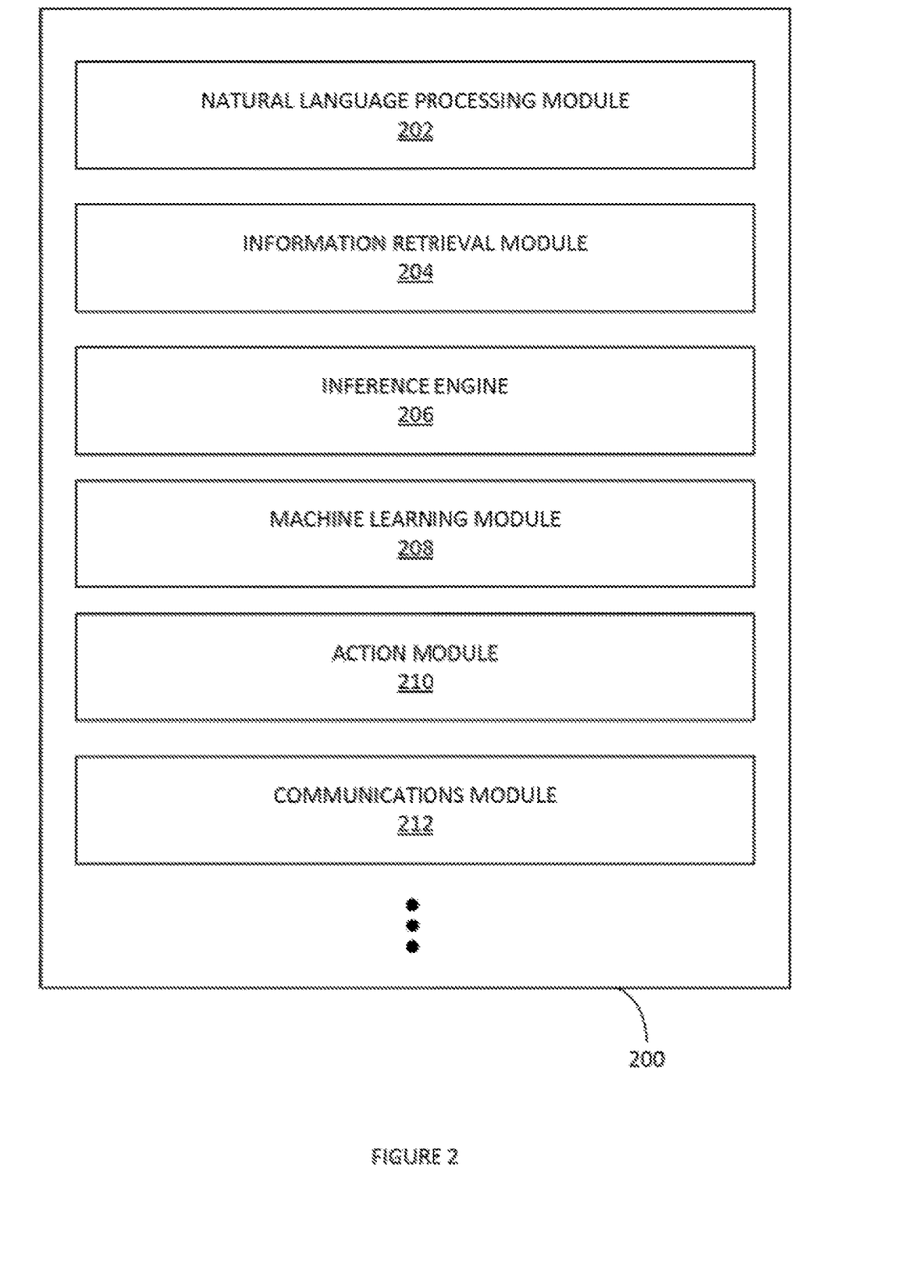
FIG. 2 an example computerized AAS system, according to some embodiments.

FIG. 2 an example computerized AAS system 200, according to some embodiments. AAS system 200 can implement any RAS method provided herein. RAS system 200 can receive and interpret text message queries from an authorized user. AAS system 200 obtain information to answer said queries from a relevant data source (e.g. with information retrieval algorithms). AAS system 200 generate specific text message response to the user's query. AAS system 200 can communicate said specific text message responses to the user's mobile device.

For example, AAS system 200 can include a natural language processing (NLP) module 202. NLP module 202 can implement natural language understanding, part-of-speech tagging, parsing, relationship extraction and/or other NLP algorithms for interpreting an incoming user-generated texts. Moreover, NLP module 202 can include functionalities for generating a NLP text message (and/or other message type—e.g. text-to-speech for generation of voice messages, etc.).

AAS system 200 can include information retrieval module 204. Information retrieval module 204 can query various information sources relevant to a user's query. Information retrieval module 204 can also obtain information from various third-party sources (e.g. Google® search, retail websites, news websites, sports websites, etc.). Information retrieval module 204 can determine one or more best sources for query relevant information.

AAS system 200 can include an inference engine 206. Inference engine 206 can draw conclusions by analyzing queries in light of a database of expert knowledge it draws upon. Inference engine 206 can reach logical outcomes based on the premises the data establishes. Inference engine 206 can also utilize probability calculations to reach conclusions that the knowledge database doesn't strictly support, but instead implies. In one example, inference engine 206 can cycle through three sequential steps: match rules, select rules, and execute rules. The execution of the rules can result in new facts or goals being added to the knowledge base which will trigger the cycle to repeat. This cycle continues until no new rules can be matched. Accordingly, a single user response can be built and refined. Inference engine 206 can pulling all data that a user has permission to access. Inference engine 206 can determine a response that is best match of information for the user (e.g., based on a user identification and the content of the user's query).

Machine learning module 208 can learn from previous queries and responses. This can be used to increase the accuracies of later responses. For example, a user can query: "What is the status of the HP deal?" However, the token 'HP' may not be recognized. Machine learning module 208 can cause a counter query to the user to be generated and sent. The counter query can be: "What is HP?" The user can respond via text message: "Hewlett Packard". The machine learning module 208 can then interpret later uses of the token with 'Hewlett Packard'. In other examples, tokens can be learned on a user by user basis and/or a time period basis.

Action module 210 enable a user to take actions on information returned in a response to the user's query. Example actions are provided supra. For example, a user can schedule repeat queries and/or responses to be obtained and delivered on a scheduled basis. The user can forward responses to other system users. The user can provide other actions to an AAS.

Communications module 212 can interact with application programming interfaces (API) of other entities and/or various systems within an enterprise (e.g. human resources database, sales portal, etc.) to obtain information. Communications module 212 can interact mobile-side client applications. Communications module 212 can obtain information from the other modules of and compose natural languages messages (e.g. emails, text messages, push notifications, augmented-reality messages, etc.) to users. Accordingly, communications module 212 can include various human language Natural Language Generation (NLG) functionalities and/or human-language translations functionalities. Communications module 212 can also implement various context awareness methods to determine a user's current context (e.g. location, enterprise context such as position in an enterprise, calendar information, etc.).

When the user asks the question for the first time, AAS system 200 can prompt the user to provide access to the target enterprise system using their username/password or author any other type of authorization challenge. AAS system 200 can aggregate data across all users within the same entity (e.g. company) and partition the data across each target enterprise system (e.g. Salesforce®, expenses, payments etc.). In this way, a representative data set can be created for an entire organization. Additionally, result-sets can be optimized based on the aggregated data. AAS system 200 can pull in changes in damsel from the target applications on a scheduled and/or real-time basis. An initial association map per enterprise application can be fed to the AAS system 200. For instance, if AAS system 200 is automating responses from a Salesforce® application, an initial association map can represent a map of enterprise object and the actions that can be performed on these objects. A loopback from user on responses can enable AAS system 200 maintain the association map up to date. AAS system 200 can update the association map based on user questions and accuracy of responses back from the user. AAS system 200 can further include other functionalities not shown). For example, AAS system 200 can include a user-subscription manager, user-authentication manager, scheduling/calendar modules, user registration and membership managers, etc.

Figure 3:
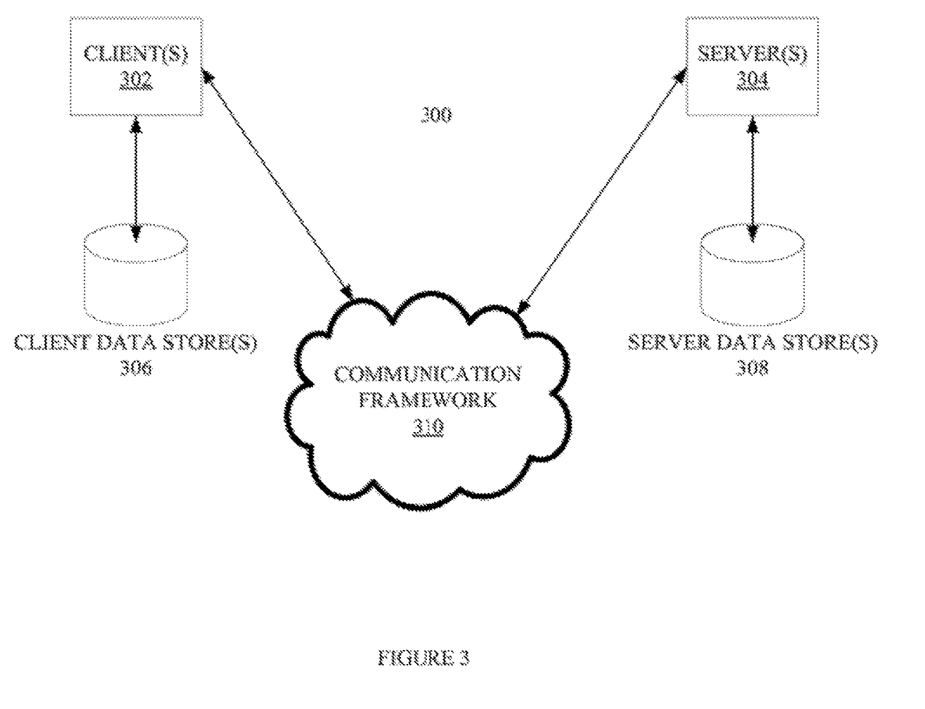
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform. Alternatively, in some examples, system 300 can be implement in a cloud-computing environment.

Figure 4:
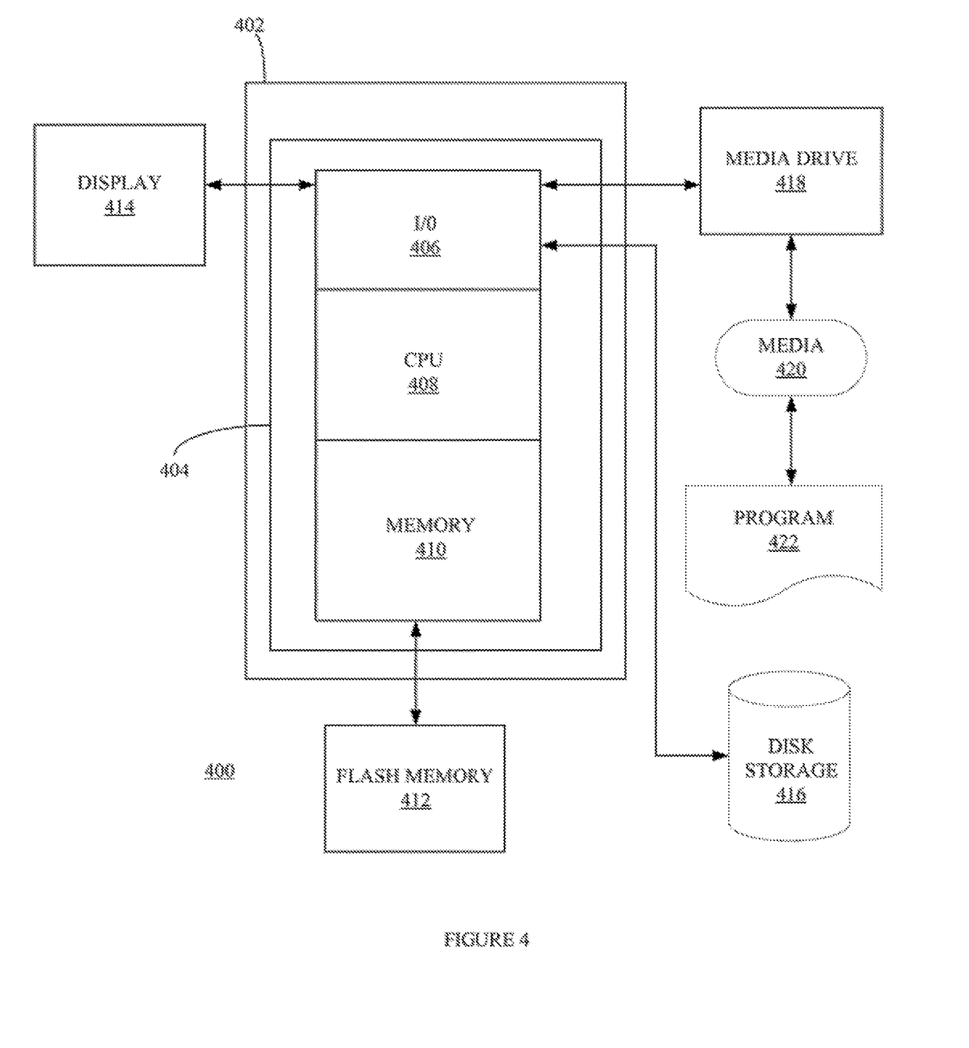
FIG. 4 depicts computing system with a number of components that may be used to perform any of the processes described herein.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB. Ethernet, cellular, an ultrasonic local area communication protocol, etc.

It is noted that databases with information can be automatically sampled by various statistical algorithm. There are several methods which may be used to select a proper sample size and/or use a given sample to make statements (within a range of accuracy determined by the sample size) about a specified population. These methods may include, for example:

1. Classical Statistics as, for example, in "Probability and Statistics for Engineers and Scientists" by R. E. Walpole and R. H. Myers, Prentice-Hall 1993; Chapter 8 and Chapter 9, where estimates of the mean and variance of the population are derived.

2. Bayesian Analysis as, for example, in "Bayestan Data Analysis" by A Gelman, I. B. Carlin, H. S. Stern and a D. B. Rubin, Chapman and Hall 1995; Chapter 7, where several sampling designs are discussed.

3. Artificial intelligence techniques, or other such techniques as Expert Systems or Neural Networks as, for example, in "Expert Systems: Principles and Programming" by Giarratano and G. Riley, PWS Publishing 1994; Chapter 4, or "Practical Neural Networks Recipes in C++" by T. Masters, Academic Press 1993; Chapters 15, 16, 19 and 20, where population models are developed from acquired data samples.

4. Latent Dirichlet Allocation, Journal of Machine Learning Research 3 (2003) 993-1022, by David M. Blei, Computer Science Division, University of California, Berkeley, Calif. 94720, USA, Andrew Y. Ng, Computer Science Department, Stanford University, Stanford, Calif. 94305, USA A Maximum Entropy Model for Part-Of-Speech Tagging, Adwait Ratnaparkhi, University of Pennsylvania, Dept. of Computer and Information Science It is noted that these statistical and probabilistic methodologies are for exemplary poses and other statistical methodologies can be utilized and/or combined in various embodiments. These statistical methodologies can be utilized elsewhere, in whole or in part, when appropriate as well.

Example User Interfaces

Figure 5:
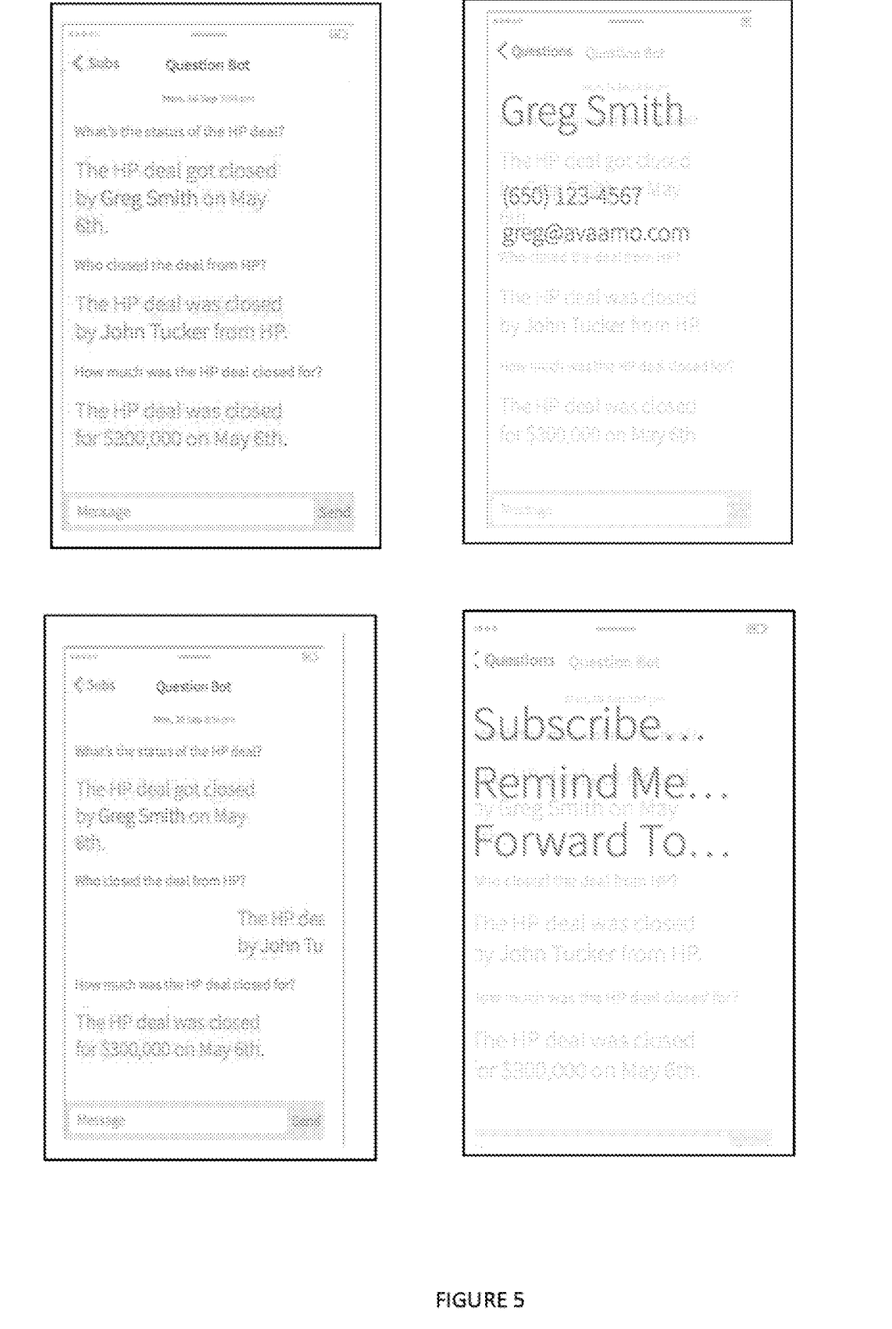
FIG. 5 illustrates a set of example user-interface screen shots for interaction with an AAS, according to some embodiments.

FIG. 5 illustrates a set of example user-interface screen shots 500 for interaction with an AAS, according to some embodiments. The user interfaces in screen shots 500 are provided for exemplary non-limiting purposes.

Additional Example Processes

Figure 6:
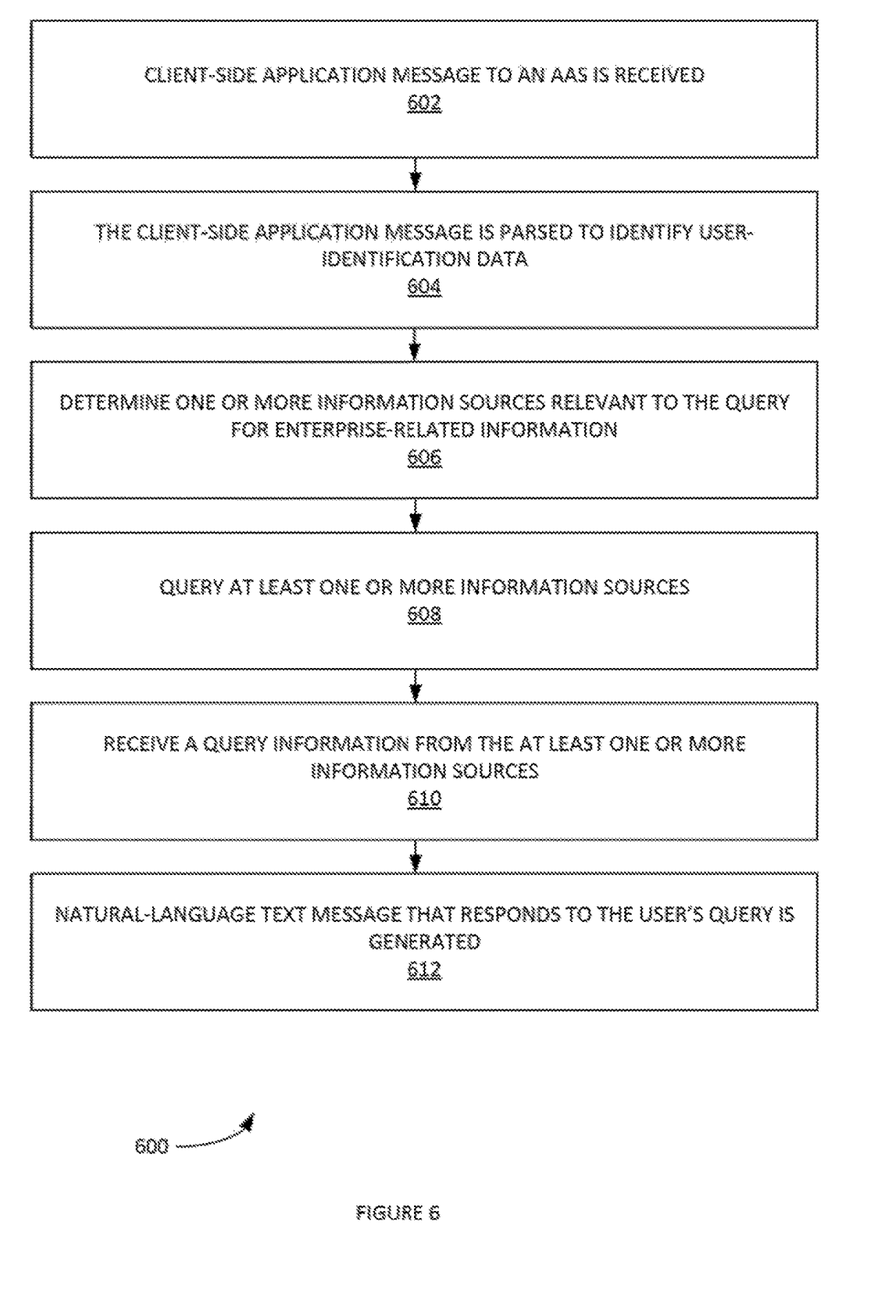
FIG. 6 illustrates another example process implemented by an AAS, according to some embodiments.

FIG. 6 illustrates another example process 600 implemented by an AAS, according to some embodiments. In step 602, a client-side application message to an AAS is received. The AAS can include a server-side entity managed by an enterprise. The client-side application message can include a user's query for enterprise-related information. In step 604, the client-side application message is parsed to identify user-identification data. In step 606, process 600 can determine one or more information sources relevant to the query for enterprise-related information. In step 608, process 600 can query at least one or more information sources. In step 610, process 600 can receive a query information from the at least one or more information sources. The query information is relevant to the user's query. In step 612, the natural-language text message that responds to the user's query can be generated. The natural-language text message can include a single response. Process 600 can be implemented by the systems provided supra.

Figure 7A:
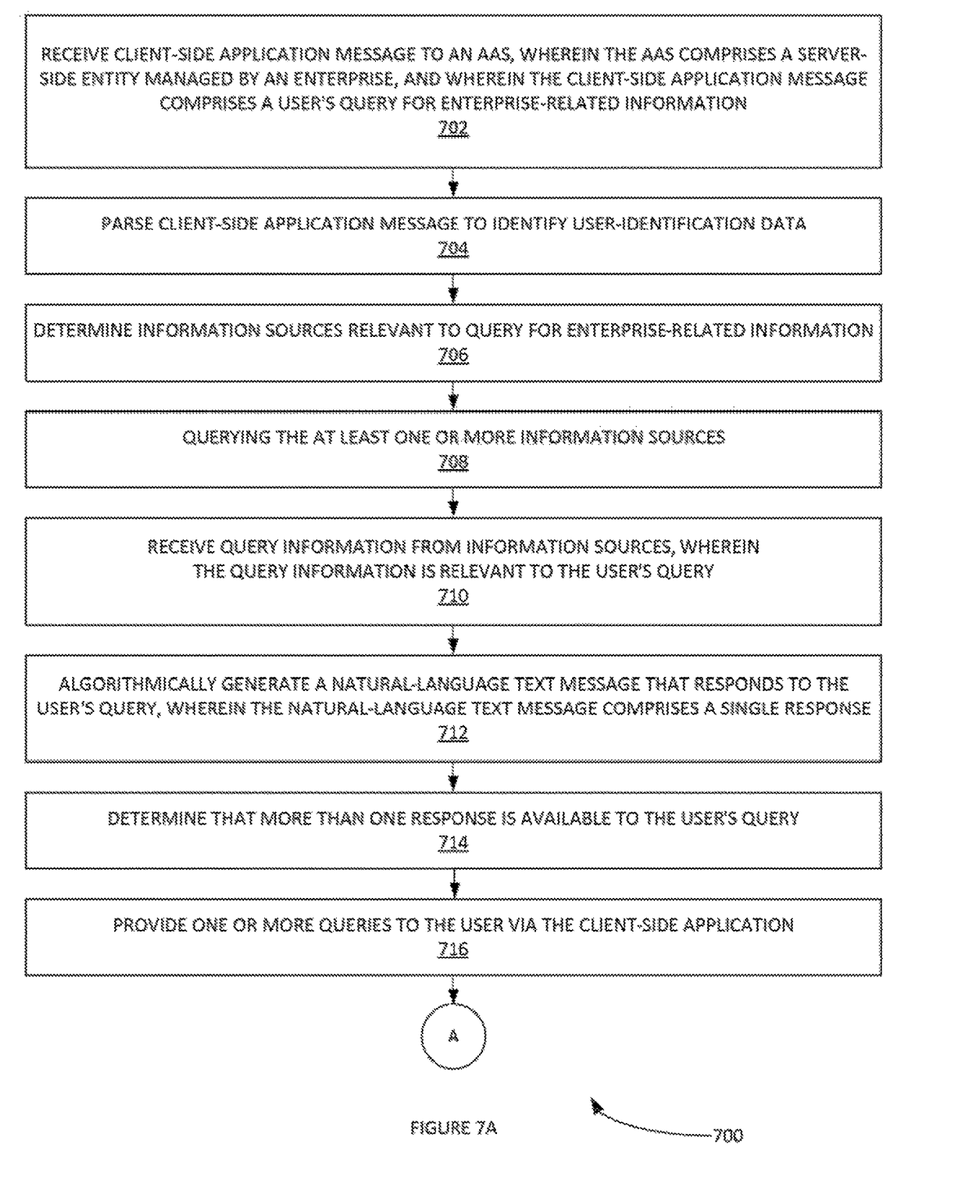
Figure 7B:
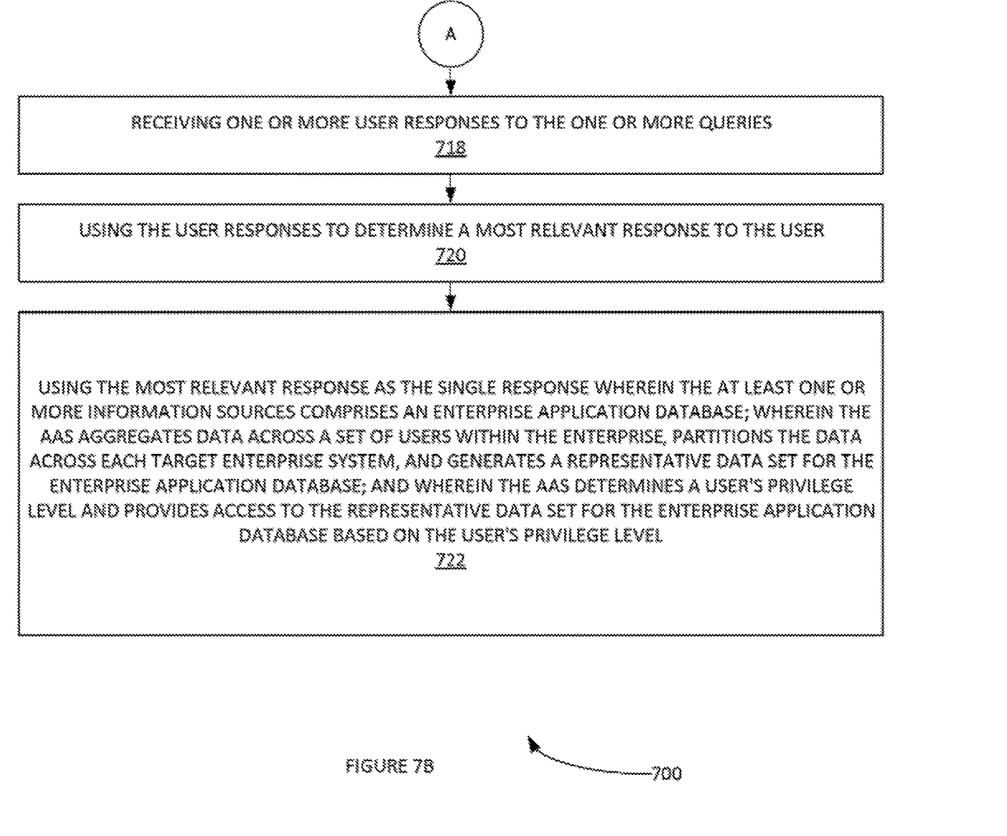

FIGS. 7 A-B illustrate an example process 700, according to some embodiments. In step 702, process 700 can receive client-side application message to an AAS, wherein the AAS comprises a server-side entity managed by an enterprse, and wherein the client-side application message comprises a user's query for enterprise-related information. In step 704, process 700 can parse client-side application message to identify user-identification data. In step 706, process 700 can determine information sources relevant to query for enterprise-related information. In step 708, process 700 can querying the at least one or more information sources. In step 710, process 700 can receive query information from information sources, wherein the query information is relevant to the user's query. In step 712, process 700 can algorithmically generate a natural-language text message that responds to the user's query, wherein the natural-language text message comprises a single response. In step 714, process 700 can determine that more than one response is available to the user's query. In step 716, process 700 can provide one or more queries to the user via the client-side application. In step 718, process 700 can receive one or more user responses to the one or more queries. In step 720, process 700 can using the user responses to determine a most relevant response to the user. In step 722, process 700 can use the most relevant response as the single response wherein the at least one or more information sources comprises an enterprise application database; wherein the AAS aggregates data across a set of users within the enterprise, partitions the data across each target enterprise system, and generates a representative data set for the enterprise application database; and wherein the AAS determines a user's privilege level and provides access to the representative data set for the enterprise application database based on the user's privilege level.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method of a designated automated answering system (AAS) comprising:
   receiving a client-side application message to an AAS, wherein the AAS comprises a server-side entity managed by an enterprise, and wherein the client-side application message comprises a user's query for enterprise-related information;
   parsing the client-side application message to identify user-identification data;
   determining at least one or more information sources relevant to the query for enterprise-related information;
   querying the at least one or more information sources;
   receiving a query information from the at least one or more information sources, wherein the query information is relevant to the user's query;
   algorithmically generating a natural-language text message that responds to the user's query, wherein the natural-language text message comprises a single response;
   determining that more than one response is available to the user's query;
   providing one or more queries to the user via the client-side application;
   receiving one or more user responses to the one or more queries;
   using the user responses to determine a most relevant response to the user; and
   using the most relevant response as the single response;
   wherein the at least one or more information sources comprises an enterprise application database;
   wherein the AAS aggregates data across a set of users within the enterprise, partitions the data across each target enterprise system, and generates a representative data set for the enterprise application database; and
   wherein the AAS determines a user's privilege level and provides access to the representative data set for the enterprise application database based on the user's privilege level.

2. The computer-implemented method of claim 1, wherein the client-side application message comprises a text message or an instant message.

3. The computer-implemented method of claim 1, wherein the AAS parses the client-side application to identify user context data.

4. The computer-implemented of claim 1, wherein the use context data is used to authenticate the user based on a user identity metadata from a client-side application in a user's mobile device and a device location of the user's mobile device.

5. The computer-implemented method of claim 1, wherein the user subscribes to a response update.

6. The computer-implemented method of claim 5, wherein the AAS periodically detects a change to the representative data set on a scheduled or real-time basis and wherein the AAS sends an updated natural-language text message for the periodically detects a change to the representative data set.

7. A computerized system, comprising:
at least one computer processor disposed in a mobile device; and
logic executable by the at least one computer processor, the logic configured to implement a method, the method comprising:
receive a client-side application message to an AAS, wherein the AAS comprises a server-side entity managed by an enterprise, and wherein the client-side application message comprises a user's query for enterprise-related information;
parse the client-side application message to identify user-identification data;
determine at least one or more information sources relevant to the query for enterprise-related information;
query the at least one or more information sources;
receive a query information from the at least one or more information sources, wherein the query information is relevant to the user's query;
algorithmically generate a natural-language text message that responds to the user's query, wherein the natural-language text message comprises a single response;
determine that more than one response is available to the user's query;
provide one or more queries to the user via the client-side application;
receive one or more user responses to the one or more queries;
use the user responses to determine a most relevant response to the user; and
use the most relevant response as the single response;
wherein the information sources comprises an enterprise application database;
wherein the AAS aggregates data across a set of users within the enterprise, partitions the data across each target enterprise system, and generates a representative data set for the enterprise application database; and
wherein the AAS determines a user's privilege level and provides access to the representative data set for the enterprise application database based on the user's privilege level.

8. The computerized-system of claim 7, wherein the user subscribes to a response update.

9. The computerized-system of claim 8, wherein the AAS periodically detects a change to the representative data set on a scheduled or a real-time basis and wherein the AAS sends an updated natural-language text message for the periodically detects a change to the representative data set.

* * * * *